United States Patent
Fernald et al.

(10) Patent No.: US 6,813,013 B2
(45) Date of Patent: Nov. 2, 2004

(54) PRESSURE-ISOLATED BRAGG GRATING TEMPERATURE SENSOR

(75) Inventors: Mark R. Fernald, Enfield, CT (US); Timothy J. Bailey, Longmeadow, MA (US); Matthew B. Miller, Glastonbury, CT (US); James M. Sullivan, Manchester, CT (US); Richard T. Jones, Hamden, CT (US); Christopher J. Wright, Amston, CT (US); Alan D. Kersey, Glastonbury, CT (US); Martin A. Putnam, Cheshire, CT (US); Robert N. Brucato, Waterbury, CT (US); Paul E. Sanders, Madison, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 186 days.

(21) Appl. No.: 10/193,876

(22) Filed: Jul. 12, 2002

(65) Prior Publication Data

US 2002/0172446 A1 Nov. 21, 2002

Related U.S. Application Data

(63) Continuation of application No. 09/456,113, filed on Dec. 6, 1999, now Pat. No. 6,452,667, which is a continuation-in-part of application No. 09/400,363, filed on Sep. 20, 1999, now abandoned, which is a continuation-in-part of application No. 09/205,942, filed on Dec. 4, 1998, now abandoned.

(51) Int. Cl.[7] ............................................. G01N 21/00
(52) U.S. Cl. .................................................... 356/73.1
(58) Field of Search ............................. 356/73.1, 35.5, 356/32, 477–479; 385/96, 12, 51, 73, 43; 250/227.14, 227.18, 231.1; 340/555–557

(56) References Cited

U.S. PATENT DOCUMENTS

| | | | |
|---|---|---|---|
| 4,636,031 A | 1/1987 | Schmadel et al. | ....... 350/96.19 |
| 4,915,467 A | 4/1990 | Berkey | ..................... 350/96.15 |
| 5,007,705 A | 4/1991 | Morey et al. | ............. 350/96.29 |
| 5,042,898 A | 8/1991 | Morey et al. | .................. 385/37 |

(List continued on next page.)

FOREIGN PATENT DOCUMENTS

| EP | 0359351 | 9/1992 | ........... C03B/37/15 |
|---|---|---|---|
| NO | 305004 | 6/1997 | |
| WO | WO/9932911 | 3/1998 | ............ G02B/6/16 |
| WO | WO/9831987 | 7/1998 | .......... G01D/5/353 |
| WO | WO/9944026 | 2/1999 | ............. G01L/9/00 |

OTHER PUBLICATIONS

M.G. Xu, Geiger and J.P. Dankin for "Fibre grating pressure sensor with enhanced sensitivity using a glass-bubble housing"—Electronics Letters—Jan. 18th 1996 vol. 32, No. 2.

"The Thickness–shear Quartz Resonator: A Rugged, Precision Pressure Transducer,"Product Feature from SENSORS, Jul. 1990.

"Design of DFB fibre laser," V.C. Lauridsen et al., Electron Lett., vol. 34, No. 21, pp. 2028–2030, 1998.

(List continued on next page.)

Primary Examiner—Tu T. Nguyen
(74) Attorney, Agent, or Firm—Moser, Patterson & Sheridan, L.L.P.

(57) ABSTRACT

A pressure-isolated Bragg grating temperature sensor includes an optical element, which includes an optical fiber having at least one Bragg grating disposed therein. The Bragg grating is encased within and fused to at least a portion of an inner glass capillary tube, or comprises a large diameter waveguide grating having a core and a wide cladding and having the grating disposed therein, encased within an outer tube to form a chamber. An extended portion of the sensing element that has the grating therein extends inwardly into the chamber, which allows the grating to sense temperature changes but isolates the grating from external pressure. More than one grating or pair of gratings may be used and more than one fiber or optical core may be used. At least a portion of the sensing element may be doped between a pair of gratings to form a temperature tuned laser, or the grating or gratings may be configured as a tunable DFB laser disposed in the sensing element.

32 Claims, 6 Drawing Sheets

U.S. PATENT DOCUMENTS

| | | | |
|---|---|---|---|
| 5,235,659 A | 8/1993 | Atkins et al. ................ 385/124 |
| 5,367,589 A | 11/1994 | MacDonald et al. .......... 385/37 |
| 5,399,854 A | 3/1995 | Dunphy et al. ........ 250/227.17 |
| 5,469,520 A | 11/1995 | Morey et al. .................. 385/37 |
| 5,511,083 A | 4/1996 | D'Amato et al. .............. 372/6 |
| 5,512,078 A | 4/1996 | Griffin .......................... 65/484 |
| 5,578,106 A | 11/1996 | Fleming et al. ............... 65/391 |
| 5,682,453 A | 10/1997 | Daniel et al. .................. 385/99 |
| 5,684,297 A | 11/1997 | Tardy .................... 250/227.14 |
| 5,691,999 A | 11/1997 | Ball et al. ...................... 373/20 |
| 5,745,626 A | 4/1998 | Duck et al. .................... 385/96 |
| 5,757,487 A | * 5/1998 | Kersey ........................ 356/450 |
| 5,771,251 A | 6/1998 | Kringlebotn et al. .......... 372/6 |
| 5,841,131 A | * 11/1998 | Schroeder et al. ...... 250/227.17 |
| 5,844,927 A | 12/1998 | Kringlebotn et al. .......... 372/6 |
| 5,889,901 A | * 3/1999 | Anderson et al. ............. 385/12 |
| 5,892,860 A | * 4/1999 | Maron et al. .................. 385/12 |
| 6,004,639 A | 12/1999 | Quigley et al. ............ 428/36.3 |
| 6,009,216 A | * 12/1999 | Pruett et al. ................... 385/12 |

OTHER PUBLICATIONS

Anonymous: "Les Capteurs A Fibres Optiques Operationnels?" Mesures Refulation Automatisme, FR, CFE, Paris, vol. 51, No. 13, Oct. 20, 1986, pp. 49–51, 53, 55, SP002083807 ISSN:0755–219X Figure 4.

Song, E. A.: "Simultaneous Measurement of Temperature and Strian Using Two Fiber Bragg Gratings Embedded in a Glass Tube," Optical Fiber Technology, US, Academic Press, London, vol. 3, No. 2, Apr. 1, 1997, pp. 194–196, XP002083806.

"Ebrium doped fibre DFB laser with permanent $\pi/2$ phase–shift induced by UV pose–processing, "P. Varming et al., IOOC '95, Tech. Digest, vol. 5, PDI–3, 1995.

Quartzdyne, Inc., Series QU/QG Spec Specificatiojn Sheet and p. 6, Section 1, General Information taken from Quartzdyne Pressure Transducers General Catalog and Operating Manual for Quartzdyne Downhole High Pressure Transducers (Series QU, QG, QL, TMC, IXP, and LP) Apr. 1, 1997.

* cited by examiner

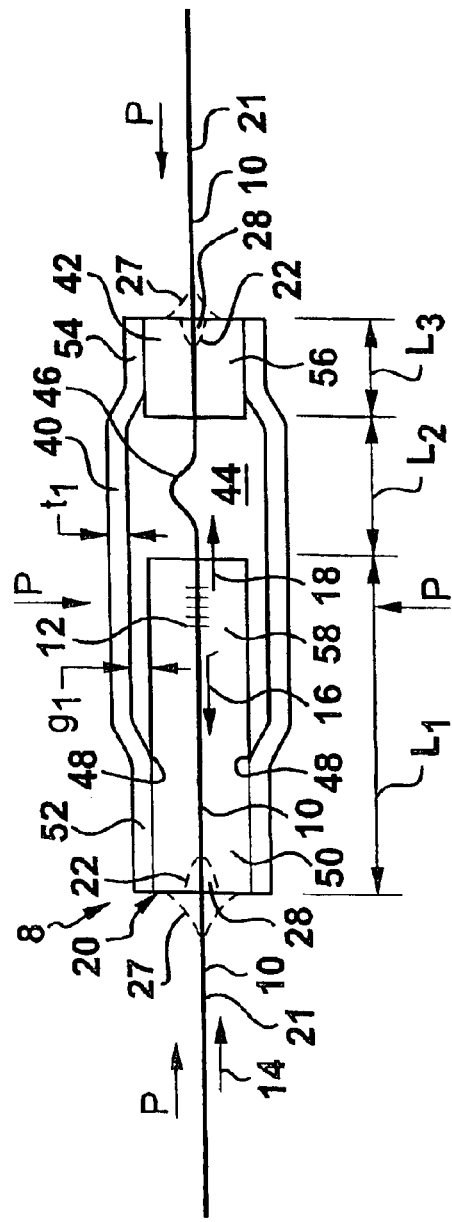
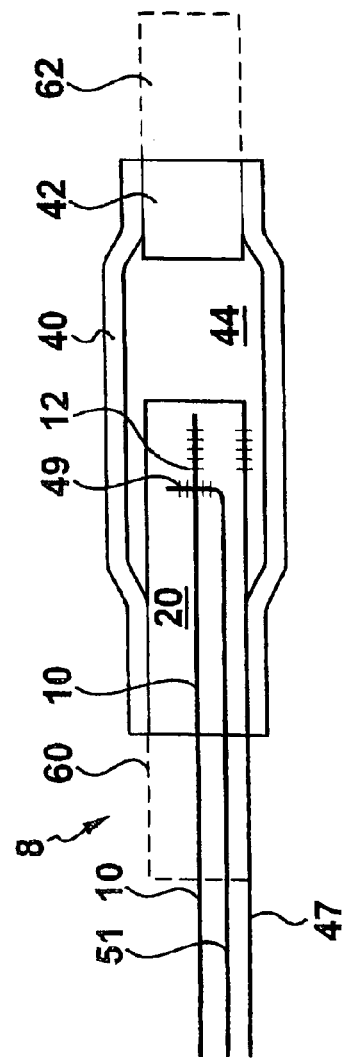
Fig. 1
Fig. 2

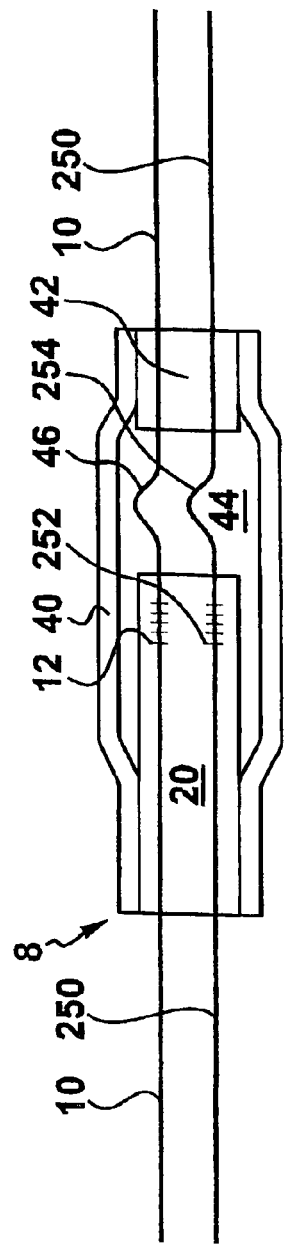
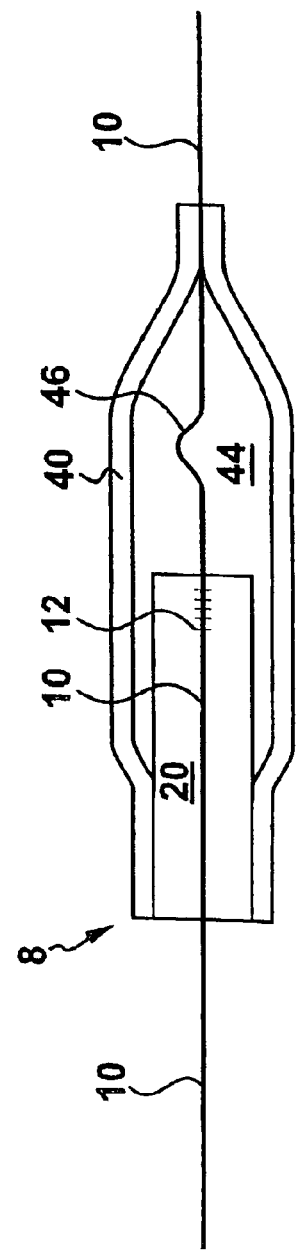
Fig. 5
Fig. 6

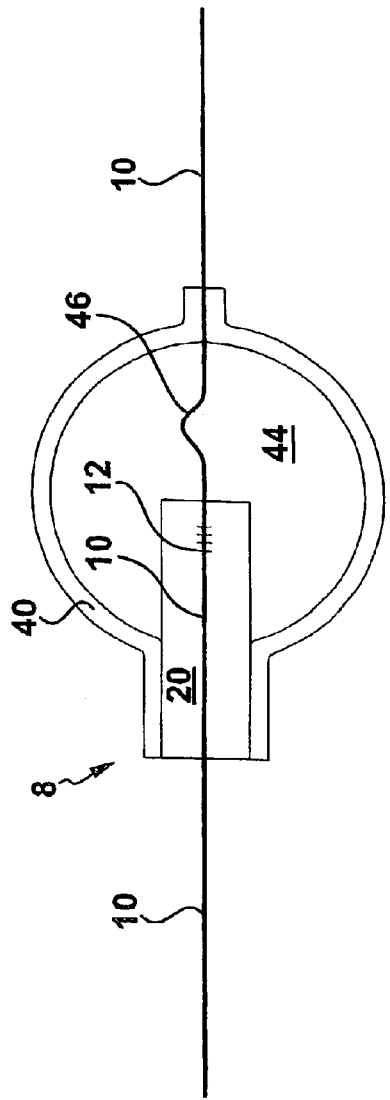
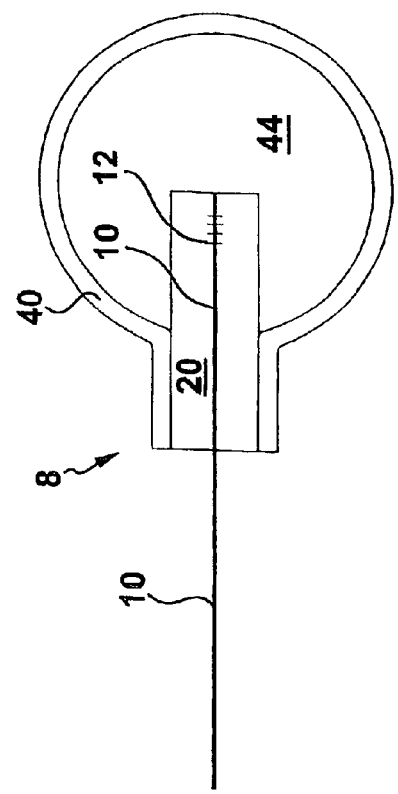
Fig. 7
Fig. 8

PRESSURE-ISOLATED BRAGG GRATING TEMPERATURE SENSOR

CROSS REFERENCE TO RELATED APPLICATIONS

This is a continuation of U.S. patent application Ser. No. 09/456,113, filed Dec. 6, 1999, now U.S. Pat. No. 6,452,667, which is a continuation-in-part of U.S. patent application Ser. No. 09/400,363, filed Sep. 20, 1999, now abandoned; which is a continuation-in-part of U.S. patent application Ser. No. 09/205,942, filed Dec. 4, 1998, now abandoned. Also, copending U.S. patent applications Ser. No. 09/455,867, entitled "Bragg Grating Pressure Sensor," Ser. No. 09/455,865, entitled "Tube-Encased Fiber Grating," Ser. No. 09/455,866, entitled "Strain-Isolated Bragg Grating Temperature Sensor," and Ser. No. 09/455,868, entitled "Large Diameter Optical Waveguide, Grating, and Laser," all filed contemporaneously herewith, contain subject matter related to that disclosed herein.

TECHNICAL FIELD

This invention relates to fiber gratings, and more particularly to a tube-encased pressure-isolated Bragg grating temperature sensor.

BACKGROUND ART

It is known in the art of fiber optics that Bragg gratings embedded in an optical fiber may be embedded in a structure and used to sense parameters such as temperature and/or strain of the structure, such as is described in U.S. Pat. No. 4,806,012, entitled "Distributed, Spatially Resolving Optical Fiber Strain Gauge," to Meltz et alt., and U.S. Pat. No. 4,996,419, entitled "Distributed Multiplexed Optical Fiber Bragg Grating Sensor Arrangement," to Morey. It is also known that the reflection wavelength λ of the grating changes with temperature (Δλ/ΔT) due to the change in refractive index and grating spacing over temperature, such as is described in U.S. Pat. No. 5,042,898, entitled "Incorporated Bragg Filter Temperature Compensated Optical Waveguide Device," to Morey et al.

Also, a fiber Bragg grating may be used in a configuration to measure pressure, such as is discussed in U.S. Pat. No. 6,016,702, entitled "High Sensitivity Fiber Optic Pressure Sensor for Use in Harsh Environments," to Robert J. Maron, which is incorporated herein by reference in its entirety. In that case, an optical fiber is attached to a compressible bellows at one location along the fiber and to a rigid structure at a second location along the fiber, with a Bragg grating embedded within the fiber between these two fiber attachment locations and with the grating being in tension. As the bellows is compressed due to an external pressure change, the tension on the fiber grating is reduced, which changes the wavelength of light reflected by the grating.

However, because the grating wavelength also changes with temperature, it is necessary to have an additional grating in thermal proximity to the pressure grating to distinguish between temperature and pressure changes. Typically, the temperature grating is isolated from the pressure signal to provide a temperature measurement independent of pressure, i.e., to temperature-compensate the pressure grating. This requires the temperature grating to be housed in a pressure-isolated chamber. Such pressure-isolated chambers can add cost, complexity, and failure modes to the sensor package.

Moreover, fiber gratings may be used solely as temperature sensors. In that case, a fiber grating by itself will exhibit a wavelength shift due to strains caused by changes in external pressure. Thus, in general, it is desirable to have a fiber grating temperature sensor that measures temperature and is not affected by external pressure changes.

SUMMARY OF THE INVENTION

Objects of the present invention include provision of a fiber grating temperature sensor that is isolated from external pressure changes.

According to the present invention, a pressure-isolated fiber optic temperature sensor, comprises: an optical sensing element, having an outer transverse dimension of at least 0.3 mm and having at least one reflective element disposed therein, the reflective element having a reflection wavelength; an optical fiber exiting from at least one axial end of the sensing element; at least a portion of the sensing element having a transverse cross-section which is contiguous and made of substantially the same material; the reflection wavelength changing due to a change in the temperature of the sensing element; and a pressure isolating structure, fused to an outer surface of the sensing element, which isolates the reflective element from strains due to pressure external to the pressure isolating structure, such that the reflection wavelength does not change due to a change in the external pressure.

According further to the present invention, the sensing element comprises: an optical fiber, having at least one reflective element embedded therein; and an inner tube, having the optical fiber and the reflective element encased therein, the inner tube being fused to at least a portion of the fiber. According further to the present invention, the sensing element comprises a large diameter optical waveguide having an outer cladding and an inner core disposed therein and having the reflective element disposed therein.

According further to the present invention, the pressure isolating structure comprises: an outer tube, having a first portion fused to a first portion of the inner tube without the reflective element; at least a portion of the outer tube and the sensing element forming a closed chamber; and a second portion of the sensing element with the reflective element disposed therein, extending into the chamber.

According further to the present invention, the sensing element has an optical fiber exiting from the second portion of the sensing element; the outer tube comprises a second portion attached to the fiber; and the fiber passes through the chamber between the second portion of the sensing element and the second portion of the outer tube.

The present invention provides a Bragg grating disposed in an optical sensing element which includes an optical fiber fused to at least a portion of a glass capillary tube ("tube encased fiber/grating") and/or a large diameter waveguide grating having an optical core and a wide cladding, which is fused within a second outer tube (i.e., a tube-in-a-tube design) which allows the grating to sense temperature changes but is not sensitive to external pressure changes. The element may be made of a glass material, such as silica.

Also, one or more gratings, fiber lasers, or a plurality of fibers or optical cores may be disposed in the sensing element.

The grating(s) or laser(s) may be "encased" in the tube by having the tube fused to the fiber on the grating area and/or on opposite axial ends of the grating area adjacent to or a predetermined distance from the grating. The grating(s) or laser(s) may be fused within the tube or partially within or to the outer surface of the tube. Also, the grating(s) or laser(s) may be oriented in any desired direction on the tube, e.g., longitudinally, radially, circumferentially, angled, curved, or other orientations. Also, one or more waveguides and/or the tube encased fiber/gratings may be axially fused to form the sensing element.

Further, the invention may be used as an individual sensor or as a plurality of distributed multiplexed sensors. Also, the invention may be a feed-through design or a non-feed-through design.

The invention may be used in harsh environments, such as in oil and/or gas wells, engines, combustion chambers, etc. For example, the invention may be an all glass sensor capable of operating at high pressures (>15 kpsi) and high temperatures (>150° C.). The invention will also work equally well in other applications independent of the type of environment.

The foregoing and other objects, features, and advantages of the present invention will become more apparent in light of the following detailed description of exemplary embodiments thereof.

BRIEF DESCRIPTION OF THE DRAWINGS

FIG. 1 is a side view of a tube-encased fiber grating temperature sensor, in accordance with the present invention.

FIG. 2 is a side view of a non-feed through tube-encased fiber grating temperature sensor, in accordance with the present invention.

FIG. 5 is a side view of two fiber grating temperature sensors on two separate optical fibers encased in a common tube, in accordance with the present invention.

FIG. 6 is a side view of a tube-encased fiber grating temperature sensor having an outer tube that is collapsed on itself, in accordance with the present invention.

FIG. 7 is a side view of a tube-encased fiber grating temperature sensor having an outer tube with a circular shape, in accordance with the present invention.

FIG. 8 is a side view of a non-feed through tube-encased fiber grating temperature sensor having an outer tube with a circular shape, in accordance with the present invention.

BEST MODE FOR CARRYING OUT THE INVENTION

Figure 3:
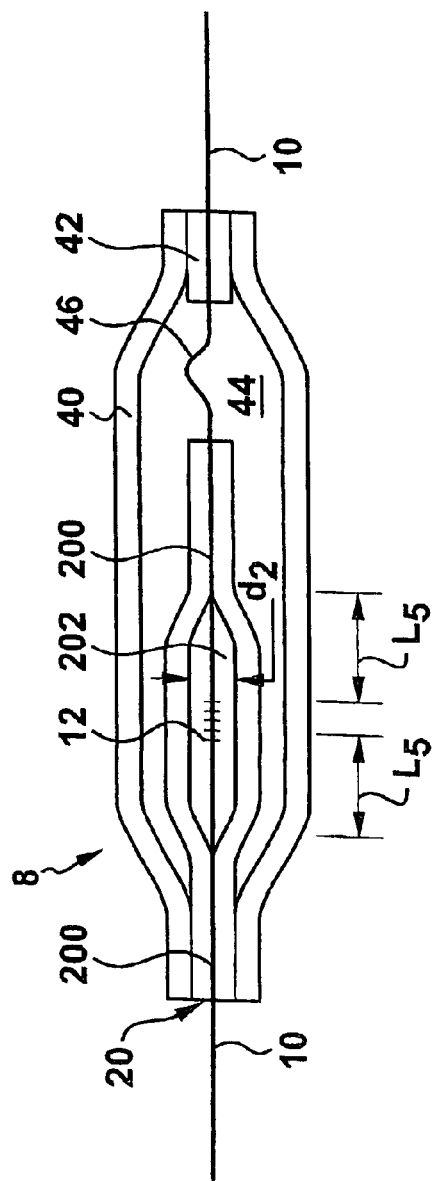
FIG. 3 is a side view of a tube-encased fiber grating temperature sensor where the tube is collapsed on opposite axial ends of the grating area, in accordance with the present invention.

Referring to FIG. 1, a pressure-isolated Bragg grating temperature sensor 8, comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass ($SiO_2$) having the appropriate dopants, as is known, to allow light 14 to propagate along the fiber 10. The Bragg grating 12, as is known, is a periodic or a periodic variation in the effective refractive index and/or effective optical absorption coefficient of an optical waveguide, similar to that described in U.S. Pat. Nos. 4,725,110, and 4,807,950 entitled "Method for Impressing Gratings Within Fiber Optics", to Glenn et al; and U.S. Pat. No. 5,388,173, entitled "Method and Apparatus for Forming A periodic Gratings in Optical Fibers", to Glenn, which are hereby incorporated by reference to the extent necessary to understand the present invention. However, any wavelength-tunable grating or reflective element embedded, etched, imprinted, or otherwise formed in the fiber 10 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, e.g., silica, phosphate glass, or other glasses, or made of glass and plastic, or solely of plastic. For high temperature applications, optical fiber made of a glass material is desirable. Also, the fiber 10 may have an outer diameter of 80 microns or other diameters. Further, instead of an optical fiber, any optical waveguide may be used, such as, a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above-described waveguides.

The light 14 is incident on the grating 12, which reflects a portion thereof (line 16) having a predetermined wavelength band of light centered at a reflection wavelength Δb, and passes (line 18) the remaining wavelengths of the incident light 14 (within a predetermined wavelength range).

The fiber 10 with the grating 12 therein is encased within and fused to at least a portion of a cylindrical glass capillary inner tube 20 (discussed more hereinafter). The inner tube 20 (with the grating 12 encased therein) is encased within an outer tube 40 to form the pressure-isolated temperature sensor 8. In particular, a portion 50 of the outer diameter of the inner tube 20 is fused to a portion 52 of the inner diameter of the outer tube 40. Another portion 54 of the inner diameter of the outer tube 40 is fused to at least a portion 56 of the outer diameter of an end cap tube 42 (or second inner tube). A closed hermetically sealed chamber (or cavity) 44 exists between the inner tube 20, the end tube 42, and the outer tube 40. The chamber 44 may be evacuated. An axially extended portion 58 of the inner tube 20 has the grating 12 therein and extends inwardly into the chamber 44. The grating 12 is located to the right of a fusion point 48 between the inner to tube 20 and the outer tube 40. The tube 42 may (but is not required to) be made of the same material and have the same transverse cross-sectional shape as the tube 20. The fiber 10 is fed through and fused to the inside of end tube 42 similar to the way the fiber 10 is fused within the tube 20. Also, the fiber 10 has some slack 46 to allow the tube 40 to expand and contract without breaking or significantly weakening the fiber 10.

As the external pressure, P, changes, the outer tube 40 compresses or deflects, the end cap 42 and/or the inner tube 20 move toward each other, and the fiber 10 flexes in the chamber 44. However, the portion of the inner tube 20 where the grating 12 is encased is not exposed to the change in external pressure P because the grating 12 is located to the right of the fusion point 48 between the inner tube 20 and the outer tube 40. Thus, the reflection wavelength of the grating 12 does not change due to the pressure P change, but will change with temperature. Accordingly, external pressure P exerted on the outer tube 40, on the end cap 42, or on the exposed portion of the tube 20, will be isolated from the grating 12, thereby providing a temperature sensor that is isolated from changes in the external pressure P.

Some sample dimensions for the sensor 8 are as follows. The inner tube 20 has an outer diameter of about 3 mm and a length L1 of about 10 mm. The grating 12 has a length of about 5 mm. The outer tube 40 has a thickness t1 of about 0.5 mm (0.02 in) and a gap g1 of about 1.0 mm (0.04 in) between the outer diameter of the inner tube 20 and the inner diameter of the outer tube 40. The distance L2 is about 5.0 mm (0.2 in) between the end of the tube 20 and the end of the tube 42 in the chamber 44, and the length L3 is about 3.0 mm (0.12 in). Other dimensions and lengths for the tube 20 and the grating 12 may be used. Also, the fiber 10 and grating 12 need not be fused in the center of the tube 20 but may be fused anywhere along the cross-section of the tube 20. Also, the tube 20 may be fused to the fiber 10 over the entire length of the tube 20.

The tubes 20,40 are made of a glass material, such as natural or synthetic quartz, fused silica, silica ($SiO_2$), Pyrex® by Corning (boro silicate), or Vycor® by Corning (about 95% silica and 5% other constituents such as Boron Oxide), or other glasses. The tube 20 should be made of a material such that the inner surface of the tube 20 (or the inner diameter surface of a bore hole in the tube 20) can be fused to (i.e., create a molecular bond with, or melt together with) the outer surface (or cladding) of the optical fiber 10, substantially eliminating the interface between them. Likewise, the tube 40 should be made of a material such that the inner surface of the tube 40 can be fused to the outer surface of the tube 20. In other words, these elements should be fused such that the inner diameter of the tube 20 cannot be distinguished from and becomes part of the cladding of the fiber 10, and the outer diameter of the tube 20 cannot be distinguished from and becomes part of the inner diameter of the outer tube 40.

For best thermal expansion matching of the inner tube 20 to the fiber 10, and of the outer tube 40 to the inner tube 20, over a large temperature range, the coefficient of thermal expansion (CTE) of the material of the tubes 20,40 should substantially match each other and match the CTE of the material of the fiber 10. In general, the lower the melting temperature of the glass material, the higher the (CTE). Thus, for a fiber 10 made of silica (having a high melting temperature and low CTE) and tubes 20 made of another glass material, such as Pyrex® or Vycor® (having a lower melting temperature and higher CTE), a mismatch in thermal expansion may exist between the tube 20 and the fiber 10 over a temperature range.

However, it is not required for the present invention that the CTE of the fiber 10, the inner tube 20, and the outer tube 40 all match each other. In particular, the more the CTE mismatch between the fiber 10 and the inner tube 20, the greater the sensitivity of grating 12 reflection wavelength shift due to temperature changes, and hence the more sensitive the temperature sensor becomes. For example, for a silica fiber 10 (CTE=$5.5 \times 10^{-7}/°C$.), a tube 20 made of Vycor® (CTE=$7.5 \times 10^{-7}/°C$.) or Pyrex® (CTE=$32.5 \times 10^{-7}/°C$.) would provide greater sensitivity than a silica tube.

Instead of the tubes 20,40 being made of a glass material, other elastically deformable materials may be used, provided the inner tube 20 can be fused to the fiber 10 and the outer tube 40 can be fused to the inner tube 20. For example, for an optical fiber made of plastic, the tubes 20,40 made of a plastic material may be used. Also, more than one concentric tube may be fused together to form the tube 20 of the present invention, such as is discussed in the aforementioned U.S. patent application Ser. No. 09/455,865.

The exterior axial ends of the inner tube 20 and of the end cap tube 42 where the fiber 10 exits the sensor 8 may have an inner region 22 which is inwardly tapered (or flared) away from the fiber 10 to provide strain relief for the fiber 10 or for other reasons. In that case, an area 28 between the tube 20 and the fiber 10 may be filled with a strain relief filler material, e.g., polyimide, silicone, or other materials.

Alternatively, instead of having the inner tapered region 22, the exterior axial ends of the tubes 20,42 where the fiber 10 exits the sensor 8 may have an outer tapered (or fluted, conical, or nipple) section, shown as dashed lines 27, which has an outer geometry that decreases down to the fiber 10. It has been determined that using the fluted sections 27 provides enhanced pull strength at and near the interface between the fiber 10 and the tubes 20,42, e.g., 6 lbf or more, when the fiber 10 is pulled along its longitudinal axis.

Also, the interior axial ends of the tubes 20,42 where the fiber 10 exists the tubes 20,42 at the chamber 44, may have the inner tapered regions 22 or the fluted regions 27 if desired (not shown).

The tubes 20,40 may have cross-sectional shapes other than circular, such as square, rectangular, elliptical, clam-shell, or other shapes, and may have side-view sectional shapes other than rectangular, such as circular, square, elliptical, clam-shell or other shapes. Also, the tubes 20,40 may have various different geometries, depending on the application. For example, the tube-encased pressure-isolated fiber grating temperature sensor 8 of the present invention may be part of a larger sensor, such as a temperature-compensated pressure sensor, as is described in copending U.S. patent application Ser. No. 09/455,867, entitled "Tube-Encased Fiber Grating Pressure Sensor." Any varying geometry of the tube 20 may be formed as described in the copending U.S. patent application Ser. No. 09/455,865, entitled "Tube-Encased Fiber Grating," which is incorporated herein by reference.

Where the fiber 10 exits the sensor 8, the fiber 10 may have an external protective buffer layer 21 to protect the outer surface of the fiber 10 from damage. The buffer 21 may be made of polyimide, silicone, Teflon® (polytetraflouroethylene), carbon, gold, and/or nickel, and may have a thickness of about 25 microns. Other thicknesses and buffer materials for the buffer layer 21 may be used. If the inner tapered axial region 22 is used and is large enough, the buffer layer 21 may be inserted into the region 22 to provide a transition from the bare fiber in the sensor 8 to a buffered fiber. Alternatively, if the region has the external taper 27, the buffer 21 would begin where the fiber exits the taper 27. If the buffer 21 starts after the fiber exit point, the fiber 10 may be recoated with an additional buffer layer (not shown) which covers any bare fiber outside of the sensor 8 and which overlaps with the buffer 21, and which may also overlap some of the taper 27 or the end of the tubes 20,42.

The grating 12 may be impressed in the fiber 10 before or after the capillary tube 20 is encased around the fiber 10. If the grating 12 is impressed in the fiber 10 after the tube 20 is encased around the grating 12, the grating 12 may be written through the tube 20 into the fiber 10 as is described in copending U.S. Pat. No. 6,298,184, entitled "Method and Apparatus For Forming A Tube-Encased Bragg Grating," filed Dec. 4, 1998.

To encase the fiber 10 within the inner tube 20, the tube 20 may be heated, collapsed, and fused to the grating 12, by a laser, filament, flame, etc., as is described in the aforementioned copending U.S. patent application Ser. No. 09/455,865, entitled "Tube-Encased Fiber Grating," filed contemporaneously herewith. Other techniques may be used for collapsing and fusing the tubes 20 to the fiber 10, such as are discussed in U.S. Pat. No. 5,745,626, entitled "Method For And Encapsulation Of An Optical Fiber," to Duck et al., or U.S. Pat. No. 4,915,467, entitled "Method of Making Fiber Coupler Having Integral Precision Connection Wells," to Berkey, which are incorporated herein by reference to the extent necessary to understand the present invention. Alternatively, other techniques may be used to fuse the fiber 10 to the tube 20, such as using a high temperature glass solder, e.g., a silica solder (powder or solid), such that the fiber 10, the tube 20 and the solder all become fused to each other, or using laser welding/fusing or other fusing techniques. Also, the fiber may be fused within the tube or partially within or on the outer surface of the tube (discussed hereinafter with FIG. 2). Similar techniques may be used to fuse the outer tube 40 to the inner tube 20.

The grating 12 may be encased in the tube 20 having an initial pre-strain from the tube (compression or tension) or no pre-strain. For example, if Pyrex® or another glass that has a larger CTE than that of the fiber 10 is used for the tube 20, when the tube 20 is heated, collapsed, and fused to the fiber and then cooled, the grating 12 is put in compression by the tube 20. Alternatively, the fiber grating 12 may be encased in the tube 20 in tension by putting the grating in tension during the tube heating and collapsing process. Also, the fiber grating 12 may be encased in the tube 20 resulting in neither tension nor compression on the grating 12. Also, one or both of the tubes 20,42 may extend beyond the end of the tube 40 as indicated by dashed lines 60,62, respectively, as shown in FIG. 2.

The fluted sections 27 (FIG. 1) may be formed in various ways, such as is described in the aforementioned copending U.S. patent application Ser. No. 09/455,865, entitled "Tube-Encased Fiber Grating," for example, by heating the tube 20 and pulling the tube and/or the fiber 10, or by using other glass formation techniques such as grinding, polishing, or etching the axial ends of the capillary tube 20.

Also, the inner region 22 may be created by numerous techniques such as is described in the aforementioned copending U.S. patent application Ser. No. 09/455,865, entitled "Tube-Encased Fiber Grating." For example, by not collapsing the tube 20 to the fiber 10 in the regions 22, or by creating a region 22 that is larger than the inner diameter of the tube 20, the tube 20 may be heated in the desired region to be expanded and internal pressure applied to the tube 20.

Referring to FIG. 2, instead of the fiber 10 being fed through the chamber 44 and the end cap tube 42, the fiber 10 may end within the tube 20 to the right of the grating 12. Also, as discussed hereinbefore, the fiber 10 and/or grating 12 may be fused within, partially within, or on the outer surface of the tube 20, as indicated by the fiber 47. Also, the fiber 10 and/or grating 12 may be oriented in any desired direction on the tube, e.g., longitudinally, transversely (or radially), circumferentially, angled, curved, or other orientations, as indicated by a grating 49 on a fiber 51. Also, instead of being straight, the outer tube 40 may have an inner curvature, an outer curvature, may be corrugated, or may have other shapes.

Referring to FIG. 6, instead of the end cap tube 42, the outer tube 40 may be collapsed on itself to form the chamber 44.

Referring to FIGS. 7,8, alternatively, the outer tube 40 may have a circular shaped side cross-sectional shape. In that case, the tube 40 may be a sphere (or bubble), or other closed three-dimensional shape having a circular side view.

Referring to FIG. 3, alternatively, the tube 20 may be collapsed and fused to the fiber 10 at a predetermined distance L5 from the grating 12, where L5 can be any desired length at the edge of the grating 12 (e.g., L5 can equal zero). In particular, regions 200 of the tube 20 are fused to the fiber 10 and a central section 202 of the tube around the grating 12 is not fused to the fiber 10. The region 202 around the grating 12 may contain ambient air or be evacuated (or be at another pressure) or may be partially or totally filled with an adhesive, e.g., epoxy, or other filling material, e.g., a polymer or silicone, or another material. The inner diameter d2 of the tube 20 may be close to the fiber 10, e.g., about 0.01 to 10 microns larger than the diameter of the optical fiber 10, e.g., 125.01 to 135 microns, or may have larger diameters, as it is not required to radially constrain the fiber 10 or grating 12 in the section 202 for temperature sensing. Moreover, the fiber 10 and grating 12 in the section 202 may be taught or may have some slack. Also, the distance L5 need not be symmetric around both sides of the grating 12. Alternatively, the same result can be achieved by fusing two separate tubes on opposite sides of the grating 12 and then fusing an outer tube across the tubes, as discussed in the aforementioned copending U.S. patent application Ser. No. 09/455,865.

Figure 4:
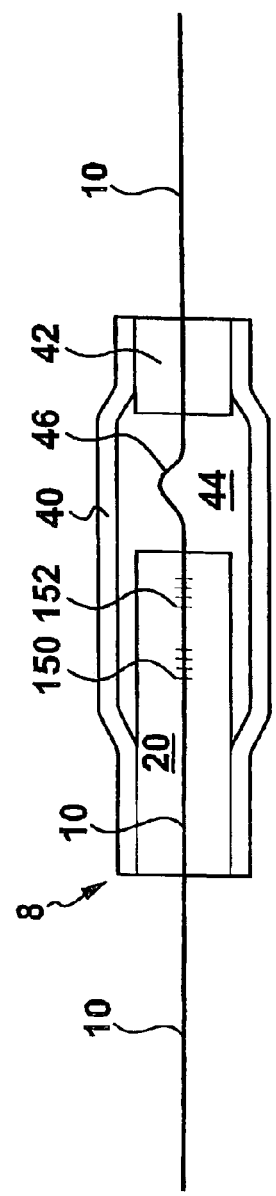
FIG. 4 is a side view of a tube-encased fiber grating temperature sensor having more than one grating encased in the tube, in accordance with the present invention.

Referring to FIG. 4, for any of the embodiments described herein, instead of a single grating encased within the tube 20, two or more gratings 150,152 may be embedded in the fiber 10 that is encased in the tube 20. Such multiple gratings 150,152 may be used to measure the temperature at multiple points along the tube 20. In that case, the gratings 150,152 may have different reflection wavelengths $\lambda 1, \lambda 2$ and/or profiles, respectively.

Alternatively, the multiple gratings 150,152 may be used to sense temperature individually in a known Fabry Perot arrangement. Further, one or more fiber lasers, such as those described in U.S. Pat. Nos. 5,513,913, entitled "Active Multipoint Fiber Laser Sensor," 5,564,832, entitled "Birefringent Active Fiber Laser Sensor," or 5,666,372, entitled "Compression Tuned Fiber Laser," may be embedded within the fiber 10 in the tube 20. These three U.S. patents are incorporated herein by reference to the extent necessary to understand the present invention. In this configuration, the gratings 150,152 form a cavity and the fiber 10 at least between the gratings 150,152 (may also include the gratings 150,152 and/or the fiber 10 outside the gratings, if desired) would be doped with a rare earth dopant, e.g., erbium and/or ytterbium, etc. The lasing wavelength would then shift as temperature changes.

Figure 10:
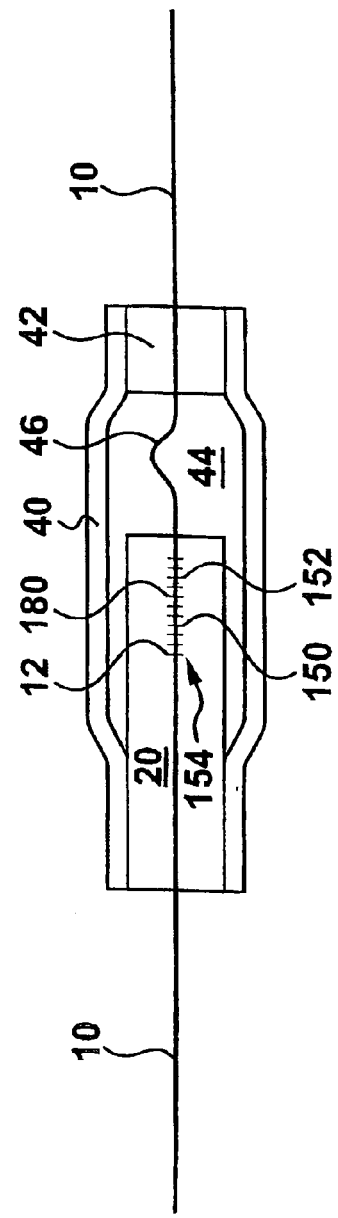
FIG. 10 is a side view of a tube-encased fiber grating temperature sensor having a tunable DFB laser encased in the tube, in accordance with the present invention.

Referring to FIG. 10, another type of tunable fiber laser that may be used is a tunable distributed feedback (DFB) fiber laser 154, such as those described in V. C. Lauridsen et al., "Design of DFB Fibre Lasers," Electronic Letters, Oct. 15, 1998, Vol. 34, No. 21, pp. 2028–2030; P. Varming et al., "Erbium Doped Fiber DGB Laser With Permanent $\pi/2$ Phase-Shift Induced by UV Post-Processing," IOOC '95, Tech. Digest, Vol. 5, PD1–3, 1995; U.S. Pat. No. 5,771,251, "Optical Fibre Distributed Feedback Laser," to Kringlebotn et al.; or U.S. Pat. No. 5,511,083, "Polarized Fiber Laser Source," to D'Amato et al. In this configuration, the grating 12 is written in a rare-earth doped fiber and configured to have a phase shift of $\lambda/2$ (where $\lambda$ is the lasing wavelength) at a predetermined location 180 near the center of the grating 12, which provides a well defined resonance condition that may be continuously tuned in single longitudinal mode operation without mode hopping, as is known. Alternatively, instead of a single grating, the two gratings 150,152 may be placed close enough to form a cavity having a length of (N+½)λ, where N is an integer (including 0) and the gratings 150,152 are formed in a rare-earth doped fiber.

Alternatively, the DFB laser 154 may be located on the fiber 10 between the pair of gratings 150,152 in which the fiber 10 is doped with a rare-earth dopant along at least a portion of the distance between the gratings 150,152. Such configuration is referred to as an "interactive fiber laser," as is described in J. J. Pan et al., "Interactive Fiber Lasers with Low Noise and Controlled Output Power," E-tek Dynamics, Inc., San Jose, Calif., internet web site www.e-tek.com/products/whitepapers. Other single or multiple fiber laser configurations may be disposed in the fiber 10 if desired.

Referring to FIG. 5, two or more fibers 10,250, each having at least one grating 12,252 therein respectively, may be encased within each of the tubes 20. Also, the bore hole for the tube 20 and the fibers 10,250 need not be centered along the center line of the tube 20. The fibers 10,250 may touch each other or they may be spaced apart in the tube 20 by a predetermined distance. If they touch each other or are in close proximity to each other, the bore hole in the tube 20 prior to heating and collapse may be other than circular, e.g., square, triangle, etc., to fit more than one optical fiber. If the fibers 10,250 are separated, the distance between the fibers 10 may be any desired distance.

Figure 9:
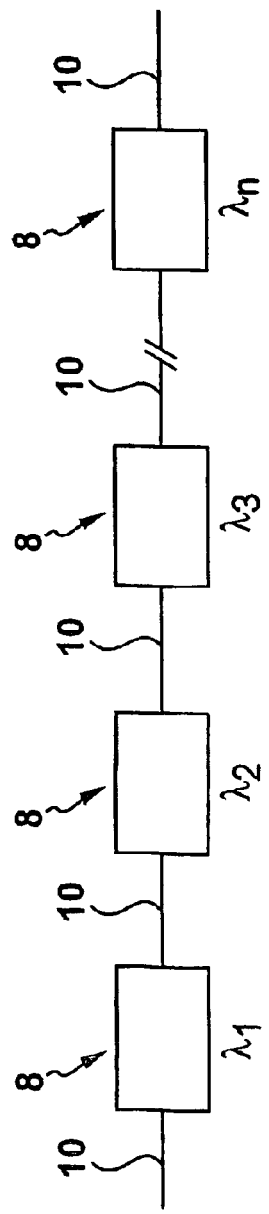
FIG. 9 is a side view of a plurality of tube-encased fiber grating temperature sensors connected in series by a common optical fiber, in accordance with the present invention.

Referring to FIG. 9, a plurality of the pass-through temperature sensors 8 described herein may be connected in series by the common optical fiber 10 to measure multiple temperature points as distributed sensors. Any known multiplexing techniques may be used to distinguish one sensor signal from another sensor signal, such as wavelength division multiplexing (WDM) or time division multiplexing (TDM) or other multiplexing techniques. In that case, the characteristic or reflection wavelength of each sensor 8 may have a different reflection wavelength (e.g., λ1,λ2,λ3, . . . λn).

Further, for any of the embodiments shown herein, instead of the fiber 10 passing through the tube 20, the fiber 10 may be single-ended, i.e., only one end of the fiber 10 exits the tube 20 (such as is shown in FIGS. 2,8). In that case, one end of the fiber 10 is would be at the exit point of the fiber 10 from the tube 20 or prior to the exit point. Also, the term "tube" as used herein may also mean a block of material having the properties described herein.

Figure 11:
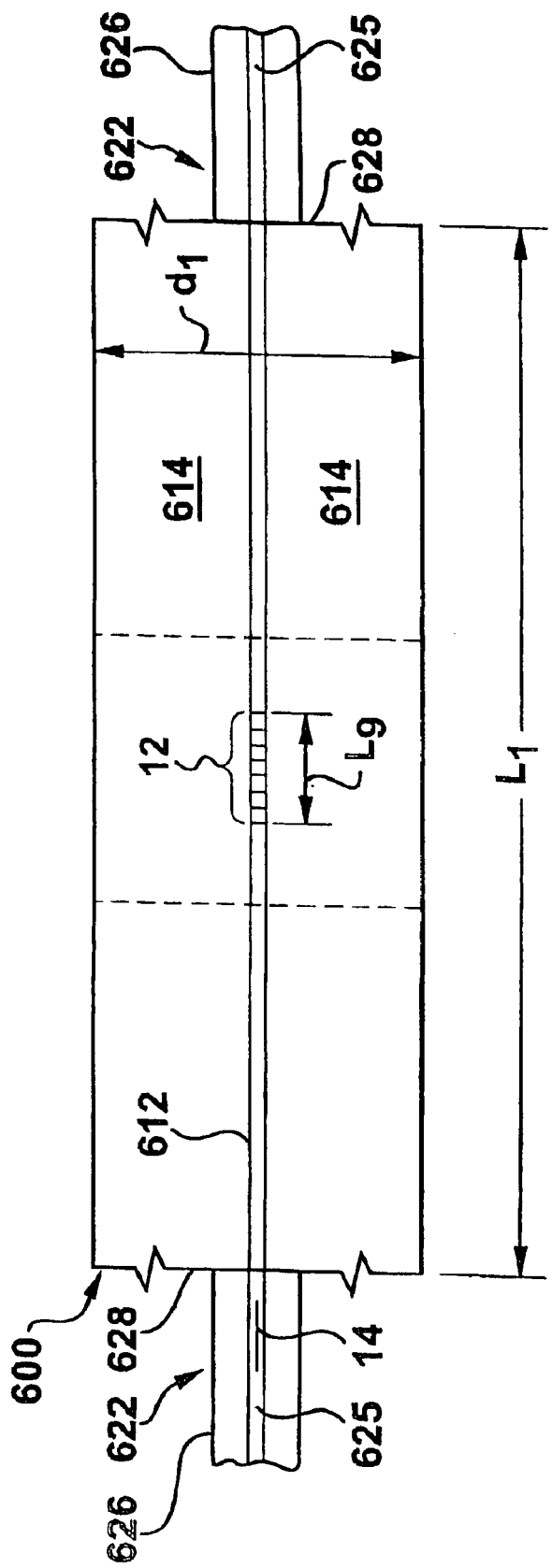
FIG. 11 is a side view of a large diameter optical waveguide having a grating disposed therein, in accordance with the present invention.

Referring to FIG. 11, a portion of or all of the tube-encased fiber grating 20 may be replaced by a large diameter silica waveguide grating 600, such as that described in copending U.S. patent application Ser. No. 09/455,868, entitled "Large Diameter Optical Waveguide, Grating and Laser," which is incorporated herein by reference. The waveguide 600 has a core 612 (equivalent to the core of the fiber 10) and a cladding 614 (equivalent to the fused combination of the tube 20 and the cladding of the fiber 10) and having the grating 12 embedded therein. The overall length L1 of the waveguide 600 and the waveguide diameter are set the same as that described hereinbefore for the tube 20 (i.e., such that the tube 20 will not buckle over the desired grating wavelength tuning range) and the outer diameter of the waveguide is at least 0.3 mm. An optical fiber 622 (equivalent to the fiber 10 in FIG. 1) having a cladding 626 and a core 625 which propagates the light signal 14, is spliced or otherwise optically coupled to one or both axial ends 628 of the waveguide 600 using any known or yet to be developed techniques for splicing fibers or coupling light from an optical fiber into a larger waveguide, and which provides acceptable optical losses for the application.

The large diameter waveguide with grating 600 may be used in the same ways as the tube encased grating 20 is used herein where the fiber 10 is analogous to (and interchangeable with) the core 612 of the waveguide 600. All alternative embodiments described herein for the tube 20 and the tube-encased grating are also applicable to the waveguide 600 where feasible, including having a fiber laser or a DFB fiber laser, multiple fibers (or cores), various geometries, etc.

The tube-encased fiber grating 20 and the large diameter waveguide grating 600 may each also be referred to herein as an "optical sensing element". The tube-encased grating 20 and the large diameter waveguide grating 600 have substantially the same composition and properties in the locations where the tube 20 is fused to the fiber 10, because the end (or transverse) cross-section of the tube-encased grating 20 and the large diameter waveguide grating 600 are contiguous (or monolithic) and are made of substantially the same material across the cross-section, e.g., a glass material, such as doped and undoped silica. Also, in these locations both have an optical core and a large cladding.

Also, the waveguide 600 and the tube-encased grating 20 may be used together to form any given embodiment of the sensing element described herein. In particular, one or more axial portion(s) of the sensing element may be a tube-encased grating or fiber and/or one or more other axial portion(s) may be the waveguide 600 which are axially spliced or fused or otherwise mechanically and optically coupled together such that the core of said waveguide is aligned with the core of the fiber fused to the tube. For example, a central region of the sensing element may be the large waveguide and one or both axial ends may be the tube-fused fiber which are fused together as indicated by dashed lines 650,652, or visa versa (FIGS. 1, 5, 11).

It should be understood that the dimensions, geometries, and materials described for any of the embodiments herein are merely for illustrative purposes and as such, any other dimensions, geometries, or materials may be used if desired depending on application, size, performance, manufacturing or design requirements, or other factors, in view of the teachings herein.

It should be understood that, unless stated otherwise herein, any of the features, characteristics, alternatives, or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A pressure-isolated temperature sensor assembly, comprising:
    a temperature sensing element, comprising:
        at least a portion of one or more optical waveguides containing at least one wavelength tunable grating formed therein; ant
        a first tube encasing one or more of the wavelength tunable gratings; and
    a pressure isolating means, comprising:
        a second tube with an inner surface contacting an outer surface of the first tube at a first axial location so as to seal the second tube at the first axial location, wherein:

the first tube extends axially from, the first axial location to a second axial location;

the first tube is not in contact with the second tube between the first axial location and the second axial location; and the second tube is sealed at a third axial location, wherein the second axial location is located between the first axial location and the third axial location.

2. The apparatus of claim 1, wherein the one or more optical waveguides comprise a material selected from the group consisting of glass, plastic, and combinations thereof.

3. The apparatus of claim 1, wherein one or more or the at least one wavelength tunable gratings comprise a fiber Bragg grating.

4. The apparatus of claim 1, wherein one or more of the at least one wavelength tunable grating comprise an element that reflects or transmits light.

5. The apparatus of claim 4, wherein the element is embedded, etched, imprinted, or otherwise formed in the optical waveguide.

6. The apparatus of claim 1, wherein one or more of the optical waveguides does not terminate axially within the first tube.

7. The apparatus of claim 6, wherein one or more of the optical waveguides extends axially to a fourth axial location, wherein the third axial location is located between the second axial location and the fourth axial location.

8. The apparatus of claim 7, wherein one or more of the optical waveguides that extend axially to the fourth axial location has slack between the second axial location and the third axial location.

9. The apparatus of claim 7, wherein the first tube is inwardly tapered or flared at one or both of:

a region surrounding one or more of the optical waveguides at the first axial location; and a region surrounding one or more of the optical waveguides at the third axial location.

10. The apparatus or claim 9, wherein one or both of the inwardly tapered or flared regions is filled with a strain relief filler material.

11. The apparatus of claim 10, wherein the strain relief filler material or silicone.

12. The apparatus of claim 7, wherein the first tube is outwardly tapered at one or both of:

a region surrounding one or more of the optical waveguides at the first axial location; and a region surrounding one or more of the optical waveguides at the third axial location.

13. The apparatus of claim 12, wherein the outward tapering defines a region of a geometry selected from the group consisting of fluted, conical, and nipple.

14. The apparatus of claim 1, wherein one or more of the optical waveguides is affixed to at least a portion of the outside of the first tube.

15. The apparatus of claim 1, wherein one or more of the wavelength tunable gratings is affixed to at least a portion of the outside of the first tube.

16. The apparatus of claim 1, wherein the one or more optical waveguides are fused to the first tube.

17. The apparatus of claim 1, wherein the first and second tubes comprise a material selected from the group consisting of plastic, glass, natural or synthetic quartz, silica, fused silica, borosilicate glass, or like materials.

18. The apparatus of claim 1, wherein the first and second tubes are fused at the first axial location.

19. The apparatus of claim 1, wherein the space axially defined by the first axial location and the third axial location, and further defined by the inner surface of the second tube, is hermetically sealed.

20. The apparatus of claim 19, wherein the hermetically sealed space is evacuated.

21. The apparatus or claim 1, wherein one or both of the first and second tubes is not cylindrical in shape.

22. The apparatus of claim 1, wherein the second tube is sealed at the third axial location by means of a sealed third tube, the outer surface of which is contacted with the inner surface of the second tube at the third axial location.

23. The apparatus of claim 22, wherein the outer surface of the third tube is fused to the inner surface of the second tube at the third axial location.

24. The apparatus of claim 1, wherein at least a portion of one or more of the optical waveguides external to the space axially defined by the first axial location and the third axial location, and further defined by the inner or surface of the second tube, comprises an external protective layer.

25. The apparatus of claim 24, wherein the protective layer comprises a material selected from the group consisting of polyimide, silicone, polytetrafluoroethylene, carbon, gold; and nickel.

26. The apparatus of claim 1, wherein the a plurality of tunable gratings create a Fabry Perot arrangement.

27. A pressure-isolated temperature sensor assembly, comprising:

a temperature sensing element, comprising:

at least a portion of one or more optical waveguides containing at least one wavelength tunable grating formed therein; and a first tube, wherein at least one of the wavelength tunable gratings is affixed or fused to the outside of the first tube; and a pressure isolating means, comprising:

a second tube with an inner surface contacting an outer surface of the first tube at a first axial location so as to seal the second tube at the first axial location, wherein:

the first tube first tube extends axially from the first axial location to a second axial location;

the first tube is not in contact with the second tube between the first axial location and the second axial location; and the second tube is sealed at a third axial location, wherein the second axial location is located between the first axial location and the third axial location.

28. A pressure-isolated temperature sensor assembly, comprising:

a temperature sensing element, comprising:

at least a portion of one or more optical waveguides containing at least one fiber laser formed therein; and a first tube encasing one or more of the fiber lasers; and a pressure isolating means, comprising:

a second tube with an inner surface contacting an outer surface of the first tube at a first axial location so as to seal the second tube at the first axial location, wherein:

the first tube extends axially from the first axial location to a second axial location;

the first tube is not in contact with the second tube between the first axial location and the second axial location; and the second lube is sealed at a third axial location, wherein the second axial location is located between the first axial location and the third axial location.

29. The apparatus of claim 28, wherein the fiber laser comprises:
   two reflective elements embedded in the waveguide;
   a cavity formed in the first tube thereby; and
   a rare earth dopant on the waveguide therebetween.

30. The apparatus of claim 29, wherein the dopant is selected from the group consisting of erbium, ytterbium, and combinations thereof.

31. The apparatus of claim 28, wherein the fiber laser is a tunable distributed feedback fiber laser.

32. The apparatus of claim 28, wherein the fiber laser lases at a lasing wavelength that changes as temperature changes.

* * * * *